United States Patent
Park et al.

(10) Patent No.: US 10,685,556 B2
(45) Date of Patent: Jun. 16, 2020

(54) SYSTEM AND METHOD FOR VEHICLE INSPECTION

(71) Applicants: HYUNDAI MOTOR COMPANY, Seoul (KR); KIA MOTORS CORPORATION, Seoul (KR)

(72) Inventors: Jun Yeon Park, Uiwang-si (KR); Jihoon Park, Suwon-si (KR); Jin Seok Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 297 days.

(21) Appl. No.: 15/824,831

(22) Filed: Nov. 28, 2017

(65) Prior Publication Data

US 2019/0066484 A1    Feb. 28, 2019

(30) Foreign Application Priority Data

Aug. 28, 2017 (KR) .......................... 10-2017-0108715

(51) Int. Cl.
| | | |
|---|---|---|
| *G01M 17/00* | (2006.01) | |
| *G06F 7/00* | (2006.01) | |
| *G06F 11/30* | (2006.01) | |
| *G06F 19/00* | (2018.01) | |
| *G07C 5/00* | (2006.01) | |
| *G08B 25/10* | (2006.01) | |
| *H04W 4/90* | (2018.01) | |
| *H04W 4/44* | (2018.01) | |
| *G08B 29/12* | (2006.01) | |
| *H04W 4/029* | (2018.01) | |
| *H04W 4/02* | (2018.01) | |

(52) U.S. Cl.
CPC .............. *G08B 25/10* (2013.01); *G07C 5/008* (2013.01); *G08B 29/12* (2013.01); *H04W 4/44* (2018.02); *H04W 4/90* (2018.02); *H04W 4/02* (2013.01); *H04W 4/029* (2018.02)

(58) Field of Classification Search
CPC ......... G08B 25/10; G08B 29/12; H04W 4/90; H04W 4/44; H04W 4/029; H04W 4/02; G07C 5/008; G07C 5/00
See application file for complete search history.

(56) References Cited

U.S. PATENT DOCUMENTS 8,532,674 B2 * 9/2013 Arun .................... H04M 1/6075
                                                          370/310
10,003,361 B2 * 6/2018 Kim ........................ H04W 4/90

FOREIGN PATENT DOCUMENTS

KR    10-2017-0041587 A    4/2017

* cited by examiner

*Primary Examiner* — Harry Y Oh
*Assistant Examiner* — Sohana Tanju Khayer
(74) *Attorney, Agent, or Firm* — Morgan, Lewis & Bockius LLP (57) ABSTRACT

A vehicle inspection system installed in an inspection line of a vehicle factory includes a barcode reader configured to recognize a vehicle which enters the inspection line; an antenna configured to connect a wireless on-board diagnostics (OBD) installed in the vehicle and wireless communication; an in-vehicle eCall system (IVS) installed in the vehicle and configured to provide an emergency road call service; and an inspector configured to determine whether the IVS operates normally through a simulation test of transmitting virtual accident event information to the vehicle connected to the wireless communication.

20 Claims, 4 Drawing Sheets

SYSTEM AND METHOD FOR VEHICLE INSPECTION

CROSS-REFERENCE TO RELATED APPLICATION

This application claims the benefit of priority to Korean Patent Application No. 10-2017-0108715, filed in the Korean Intellectual Property Office on Aug. 28, 2017, the entire content of which is incorporated herein by reference.

TECHNICAL FIELD

The present disclosure relates to a system and method for vehicle inspection, and more particularly, to a vehicle inspection system and method for inspecting an in-vehicle emergency call (eCall) system (IVS) installed in a vehicle in an inspection line of a vehicle factory through wireless communication.

BACKGROUND

In general, an emergency road call service refers to a service for automatically transmitting an accident location and accident information to an emergency rescue agency to request emergency recovery in the event of a collision while a vehicle is driving or a serious vehicle accident. Recently, an eCall service and an emergency road assistance GLONASS (ERA-GLONASS) service have been conducted at the initiative of the European Union (EU) and Russia, and, to this end, installation of an in-vehicle emergency call (eCall) system (IVS) has been obligated. Here, the IVS refers to a vehicle emergency call system which collects accident information from a vehicle sensor and collects an accident location and an accident time to automatically request for rescue from an emergency rescue agency, for the emergency road call service. For example, in case where a traffic accident is sensed due to an operation of an airbag of a vehicle, the IVS may automatically report occurrence of an accident. Here, the IVS may transmit traffic accident information including a vehicle type, an accident type, an accident location, an accident time, and the like, to a rescue center. Meanwhile, the IVS is required to have high reliability in that it can reduce an actual lifesaving time in the event of a traffic accident, but in a vehicle production line, an operator-centered switch operability inspection and diagnostic trouble code (DTC) reading function inspection are simply performed, having limitations in performance verification. That is, in the vehicle production line, it is impossible to test and verify performance of the IVS regarding mass-produced vehicles and it is also impossible to check defective sensitivity of a GPS receiver and verify an operational state of a mobile phone.

Matters described in the background art section are provided to promote understanding of the background of the present disclosure, which may include a matter that is not a prior art known to those skilled in the art to which the present disclosure pertains. The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a vehicle inspection system and method having advantages of enhancing reliability by connecting wireless communication to a vehicle which enters an inspection line and verifying an operational performance through a simulation test of an in-vehicle emergency call (eCall) system (IVS).

An exemplary embodiment of the present disclosure provides a vehicle inspection system installed in an inspection line of a vehicle factory, including: a barcode reader configured to recognize a vehicle which enters the inspection line; an antenna configured to connect a wireless on-board diagnostics (OBD) installed in the vehicle and wireless communication; an in-vehicle eCall system (IVS) installed in the vehicle and configured to provide an emergency road call service; and an inspector configured to determine whether the IVS operates normally through a simulation test of transmitting virtual accident event information to the vehicle connected to the wireless communication.

The IVS may include: a communication module receiving accident event information sensed by a sensor within the vehicle; a location receiving module measuring vehicle location information upon receiving a satellite signal from a GNSS (Global Navigation Satellite System); a control module generating emergency rescue request information on the basis of the accident event information and the vehicle location information; and a mobile communication module transmitting the emergency rescue request information to a set emergency rescue agency.

The location receiving module may measure the vehicle location information upon receiving a signal from at least one of GPS, GLONASS, and A-GPS systems. When an accident event occurs, the mobile communication module may automatically transmit the emergency rescue request information including at least one of a vehicle location, an accident type, vehicle information, a movement speed, and a movement direction to a related emergency rescue agency through a subscriber identification module (SIM) card.

When an accident event occurs, the control module may receive sensing information for generating the emergency rescue request information through association with an audio video navigation (AVN) and display the accident event-related information on a screen.

When a call is connected to the emergency rescue agency through the mobile communication module, the control module may attempts the call through a handsfree function of the AVN to connect the call. The control module may store an algorithm for the simulation test with the inspector, and when the virtual accident event information using a test-exclusive protocol is received from the inspector, the control module may enter a simulation test most to respond.

The inspector may include: a communicator connected to the wireless OBD through the antenna and transmitting and receiving information for vehicle inspection; a simulator generating the virtual accident event information for the simulation test; a Firmware Over-the-Air ("FOTA") service unit updating a firmware version of the IVS to a latest version through the wireless communication; and a controller controlling a general operation for the simulation test.

The simulator may generate virtual event information including a virtual satellite signal for the simulation test and a per-accident type sensor signal.

The controller may transmit a virtual satellite signal to the IVS, and when checked vehicle location information is received within a response standby time, the controller may determine that verification of the location receiving module configured in the IVS is successful.

The controller may transmit the virtual event information to the IVS, and when the emergency rescue request information is received through the SIM card of the IVS within a response standby time, the controller may determine that verification of a mobile communication module configured in the IVS is successful.

Another exemplary embodiment of the present disclosure provides a vehicle inspection method for wirelessly inspecting a vehicle by an inspector installed in an inspection line of a vehicle factory, including: a) connecting a wireless on-board diagnostics (OBD) installed in the vehicle and wireless communication to request a simulation test; b) transmitting a virtual satellite signal to an in-vehicle eCall system (IVS) providing an emergency road call service, and determining that verification of a location receiving module is successful when checked vehicle location information is received within a response standby time; c) transmitting virtual event information to the IVS, and determining that verification of a mobile communication module is successful when emergency rescue request information of the IVS is received within a response standby time; and d) when verification of the location receiving module and verification of the mobile communication module are successful, determining that the IVS normally operates.

In operation a), a barcode adhered to the vehicle may be recognized, and a vehicle identification number (VIN) matched to the barcode and the wireless OBD may be referred to a central server to connect wireless communication.

Operation a) may include: transmitting a simulation test-exclusive protocol through the wireless OBD to enable the IVS to enter a simulation test mode.

In operation b), only when coordinates of the received vehicle location information match the virtual satellite signal and receive sensitivity of the satellite signal satisfies a reference value, it may be determined that verification of the location information is successful.

Operation b) may include: when the vehicle location information is not received within the response standby time, determining that the location receiving module has an error. In operation c), incoming of an emergency call according to the virtual event information through an SIM card number of the IVS may be further detected to determine whether the verification is successful.

In operation c), the emergency rescue request information may be analyzed, and only when the emergency rescue request information matches the virtual event information, it may be determined that the verification is successful.

Operation c) may include: when the emergency rescue request information is not received within the response standby time, it may be determined that the mobile communication module has an error. Operation d) may include: checking a firmware version of the IVS through the wireless OBD, and updating the firmware version of the IVS to a latest version when the firmware version is not a latest version.

According to exemplary embodiments of the present disclosure, reliability of the emergency road call service may be enhanced by checking performance through the simulation test of the IVS by connecting the vehicle which enters the inspection line and wireless communication. Also, when simulation testing is performed, a cause of a defective IVS may be diagnosed by verifying accident location information and emergency rescue request information. In addition, since inspection on performance of the IVS, which is limitedly performed by a collision test in a road environment in the related art, is performed by wireless communication in a vehicle inspection line, it is possible to simulation-test the entire mass-produced vehicles.

DETAILED DESCRIPTION OF THE EMBODIMENTS simulatorFOTA servicestorage

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Vehicles, automobiles, or any other similar terms used throughout the specification include sports utility vehicles (SUVs), buses, trucks, cars including various commercial vehicles, vessels including various types of boats or ships, automobiles including airplanes or the like, and hybrid vehicles, electric vehicles, plug-in-hybrid electric vehicles, hydrogen fuel vehicles, and any other alternative fuel (e.g., fuel obtained from resource other than oil) vehicles.

Hereinafter, a vehicle inspection system and method according to an exemplary embodiment of the present disclosure will be described in detail with reference to the accompanying drawings.

Figure 1:
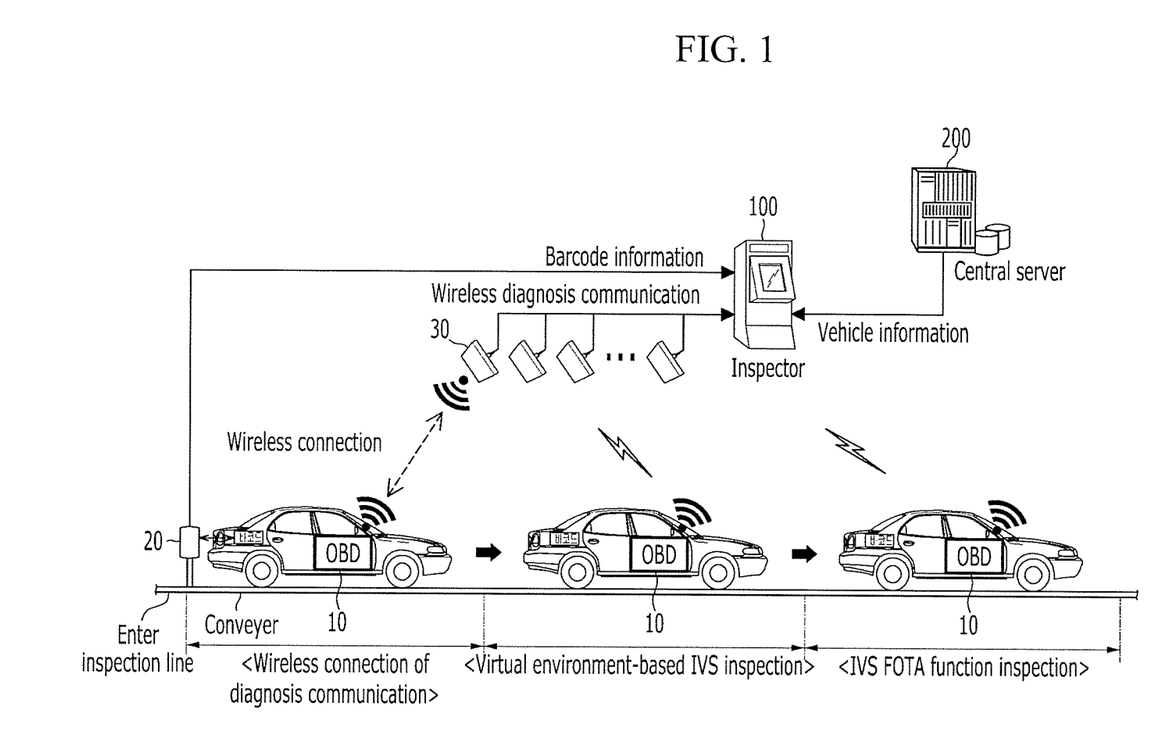
FIG. 1 a view schematically illustrating a configuration of a vehicle inspection system according to an exemplary embodiment of the present disclosure.

FIG. 1 is a view schematically illustrating a configuration of a vehicle inspection system according to an exemplary embodiment of the present disclosure.

Figure 2:
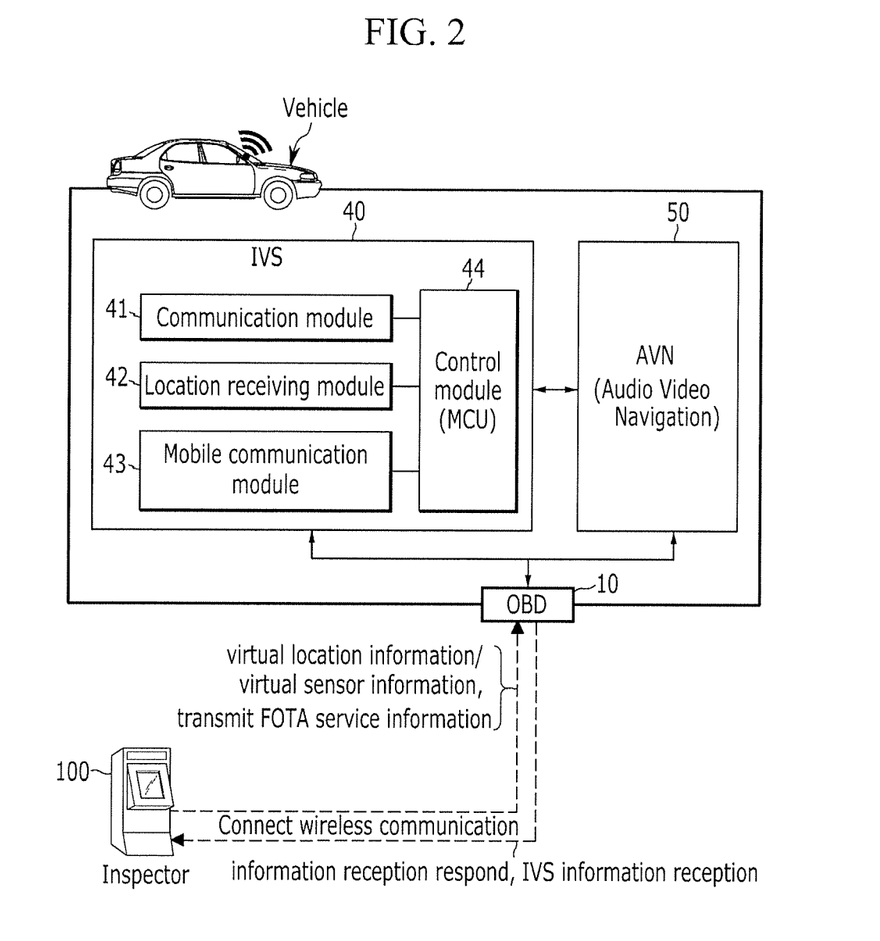
FIG. 2 is a block diagram schematically illustrating a configuration of an in-vehicle emergency call (eCall) system (IVS) according to an exemplary embodiment of the present disclosure.

FIG. 2 is a block diagram schematically illustrating a configuration of an in-vehicle emergency call (eCall) system (IVS) according to an exemplary embodiment of the present disclosure.

Referring to FIGS. 1 and 2, the vehicle inspection system according to an exemplary embodiment of the present disclosure includes a barcode scanner 20 identifying a vehicle which enters an inspection line, an antenna 30 connecting a wireless on-board diagnostics (OBD) 10 installed in the vehicle and wireless communication, and an inspector 100 inspecting a normal operational state of an in-vehicle eCall system (IVS) 40 installed within the vehicle through wireless communication.

The vehicle is assembled, while moving along several production lines on a conveyer belt, and enters an inspection line for wireless inspection of the IVS 40 installed within the vehicle.

In the vehicle, the wireless OBD 10 is mounted, and the IVS 40 and an audio video navigation (AVN) 50 connected to the OBD 10 through vehicle internal communication to interwork with each other for wireless inspection are installed.

The barcode scanner 20 reads a barcode adhered to a vehicle body to recognize a vehicle identification number (VIN) of the vehicle which enters the inspection line, and the antenna 30 connects the wireless OBD 10 matched to the VIN of the vehicle and wireless communication.

The antenna 30 is disposed in plurality along the inspection line in which the vehicle is transferred, and relays data transmitted and received between the wireless OBD 10 of each vehicle and the inspector 100 through a wireless LAN (Wi-Fi).

The IVS 40, a system for providing an emergency road call service, includes a communication module 41, a location receiving module 42, a mobile communication module 43, and a control module 44.

The communication module 41 receives accident event information (sensor information) sensed by a sensor within the vehicle through a vehicle network. The vehicle network may be a CAN communication line.

For example, the communication module 41 may collect sensor information of at least one of an airbag sensor, a collision sensor, a vibration sensor, a gyro sensor, and a vehicle speed sensor within the vehicle. On the basis of the sensor information, the control module 44 may recognize an accident event such as a collision, overturn, and the like, of the vehicle, and perform an emergency rescue request to inform about the accident event.

Also, the communication module 41 may transmit and receive data to and from the inspector 100 through the wireless OBD 10 connected to the vehicle network for wireless inspection of the vehicle.

The location receiving module 42 receives a location signal of a vehicle transmitted from satellites through antennas.

The location receiving module 42 determines vehicle location information upon receiving satellite signals from a global navigation satellite system (GNSS).

The location receiving module 42 may measure vehicle location information upon receiving satellite signals from each of a GPS and a GLONASS through satellite antennas, or measure more accurate vehicle location information upon receiving the satellite signals simultaneously.

Also, the location receiving module 42 may measure a location of a vehicle present in an area in which signals from artificial satellites are interrupted, such as a tunnel, a parking building, a high-rise building in the downtown area, and the like, upon further receiving auxiliary GPS signals through an A-GPS system.

Meanwhile, the location receiving module 42 may transmit the measured vehicle location information to the AVN 50 to share the vehicle location information.

The AVN 50, an information communication terminal including a navigation function, may combine GPS information of itself and the vehicle location information received from the location receiving module 42 to provide a vehicle location-based service (e.g., a road guidance service).

Also, the AVN 50 may omit the separate GPS configuration of itself and perform a navigation function on the basis of the vehicle location information from the location receiving module 42.

The mobile communication module 43 supports emergency communication of the vehicle automatically transmitting emergency rescue request information generated due to occurrence of an accident event to a preset emergency rescue agency. A GSM (Global System for Mobile), UMTS (Universal Mobile Telecommunications System), cellular (Cellular) and LTE communication, and the like, may be applied to the mobile communication module 43 according to a mobile communication network commercialized in a vehicle sales area (country).

When an accident occurs, the mobile communication module 43 automatically transmits emergency rescue request information including at least one of a vehicle location (accident location), an accident type, vehicle information, a movement speed, and a movement direction to an emergency rescue agency through a SIM (Subscriber Identification Module) card.

Also, the mobile communication module 43 may attempt to make a call to a phone number (e.g., 112/119) of the emergency rescue agency. The emergency rescue agency may be a traffic control sensor, a police station, a fire station, a hospital, an insurance company, a wrecker company, and the like. The control module 44 is configured as a microcontroller unit (MCU) storing a program for providing an emergency road call service and data in a memory (not shown), and controlling a vehicle emergency rescue request when an accident occurs.

When accident event information is received through the communication module 41, the control module 44 generates emergency rescue request information on the basis of the event information and the vehicle location information measured by the location receiving module 42. Also, the control module 44 transmits the generated emergency rescue request information to the mobile communication module 43 to automatically transmit the information to a previously registered emergency rescue agency.

When an accident event occurs, the control module 44 may receive detection information for generating the emergency rescue request information through association with the AVN 50, and display accident event-related information on a screen.

Also, the control module 44 may automatically attempt to make a call to the emergency rescue agency by the mobile communication module 43 through a handsfree function of the AVN 50, so as to be connected. Through association with the AVN 50, an emergency call may be advantageously automatically connected even without intervention of a driver in a physically/mentally harsh environment due to a vehicle accident.

Meanwhile, the control module 44 may store a simulation test algorithm performed in the inspection line, and when event information using a test-exclusive protocol (e.g., appointed diagnosis communication protocol) is received from the inspector 100, the control module 44 enters a simulation test mode.

Here, the control module 44 may respond (ack) to the event information received from the inspector 100 during a simulation test process as follows.

For example, when a virtual satellite signal (e.g., a satellite signal value corresponding to coordinates of Yangjae IC) for testing the location receiving module 42 is received in the simulation test mode, the control module 44 the control module 44 may respond by transmitting location information checked therethrough to the inspector 100. Here, the location information may include vehicle coordinates (e.g., the coordinates of Yangjae IC) on a map checked by the location receiving module 42 and main/auxiliary antenna receive sensitivity.

Also, when virtual event information is received from the inspector 100, the control module 44 may transmit corresponding emergency rescue request information to the inspector 100 through the mobile communication module 43, in response.

Also, when a Firmware Over-the-Air ("FOTA") signal is received, the control module 44 may transmit a currently installed firmware version to the inspector 100 in response. Here, the control module 44 may perform wireless updating by the latest firmware by the inspector 100 and transmit a corresponding result in response.

Figure 3:
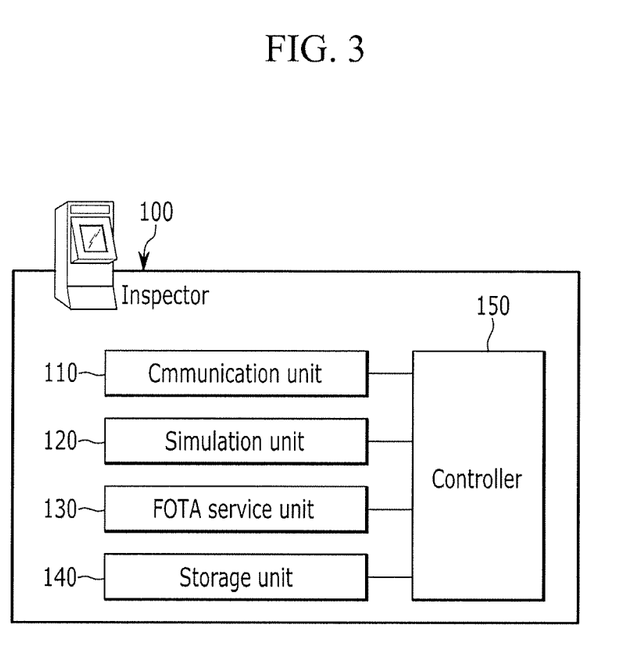
FIG. 3 is a block diagram schematically illustrating a configuration of an inspector according to an exemplary embodiment of the present disclosure.

FIG. 3 is a block diagram schematically illustrating a configuration of an inspector according to an exemplary embodiment of the present disclosure.

Referring to FIG. 3, the inspector 100 according to an exemplary embodiment of the present disclosure includes a communicator 110, a simulator 120, a FOTA service 130, a storage 140, and a controller 150.

The communicator 110 is a hardware device including a wired/wireless interface and is connected to the wireless OBD 10 through wireless communication and connected to the central server 200 (see FIG. 1) through an IP network.

The communicator 110 is connected to the wireless OBD 10 through the antenna 30 to transmit and receive information for vehicle inspection.

The communicator 110 refers information of a vehicle which enters the inspection line to the central server 200, transmits a vehicle inspection result so that the vehicle inspection result may be stored in a database.

The central server 200, a central system managing information of vehicles mass-produced in a factory, matches information such as a VIN, a vehicle barcode, a wireless OBD ID of each vehicle, an SIM card number of each vehicle, sequence information, and the like, to each vehicle and stores the matched information in the database. Also, the central server 200 tracks a vehicle location in the entire production line of the factory to manage history of a production stage and inspection information and share the history with the inspector 100.

The simulator 120 may be implemented with a hardware processor having instructions to generate virtual accident event information transmitted for a simulation test of the IVS 40 installed in the vehicle.

As described above, there is a limitation to verify the IVS 40 installed in the vehicle within the factory in terms of characteristics that the IVS 40 operates to automatically transmit emergency rescue request information to an emergency rescue agency in the actual occurrence of an accident event during an operation of the vehicle. Thus, the simulator 120 may inspect a normal operational state of the IVS 40 by establishing a simulation test environment providing the same virtual event information as that of an accident which actually occurs in the vehicle.

The simulator 120 may generate a virtual satellite signal for simulation-testing the location receiving module 42 of the IVS 40.

The virtual satellite signal, a satellite signal value corresponding to vehicle coordinates (x, y) on the map, may be randomly generated for each inspection vehicle.

Also, the simulator 120 generates virtual event information including a per-accident type sensor signal for simulation-testing the mobile communication module 43 of the IVS 40 and the AVN 50. For example, the virtual event information may be a sensor signal such as a collision, airbag deployment, and the like, and may be randomly generated for each inspection vehicle.

The FOTA service 130 requests a firmware version of the IVS 40, and when updating is required, the FOTA service 130 updates the firmware version to a latest version through wireless communication.

The storage 140 stores a program and data for vehicle inspection according to an exemplary embodiment of the present disclosure and stores data generated from the vehicle inspection.

The controller 150 controls a general operation of each part to perform a simulation test on the IVS 40 by connecting the vehicle which has entered the production line and wireless communication. This will be described through a vehicle inspection method of FIG. 4.

Figure 4:
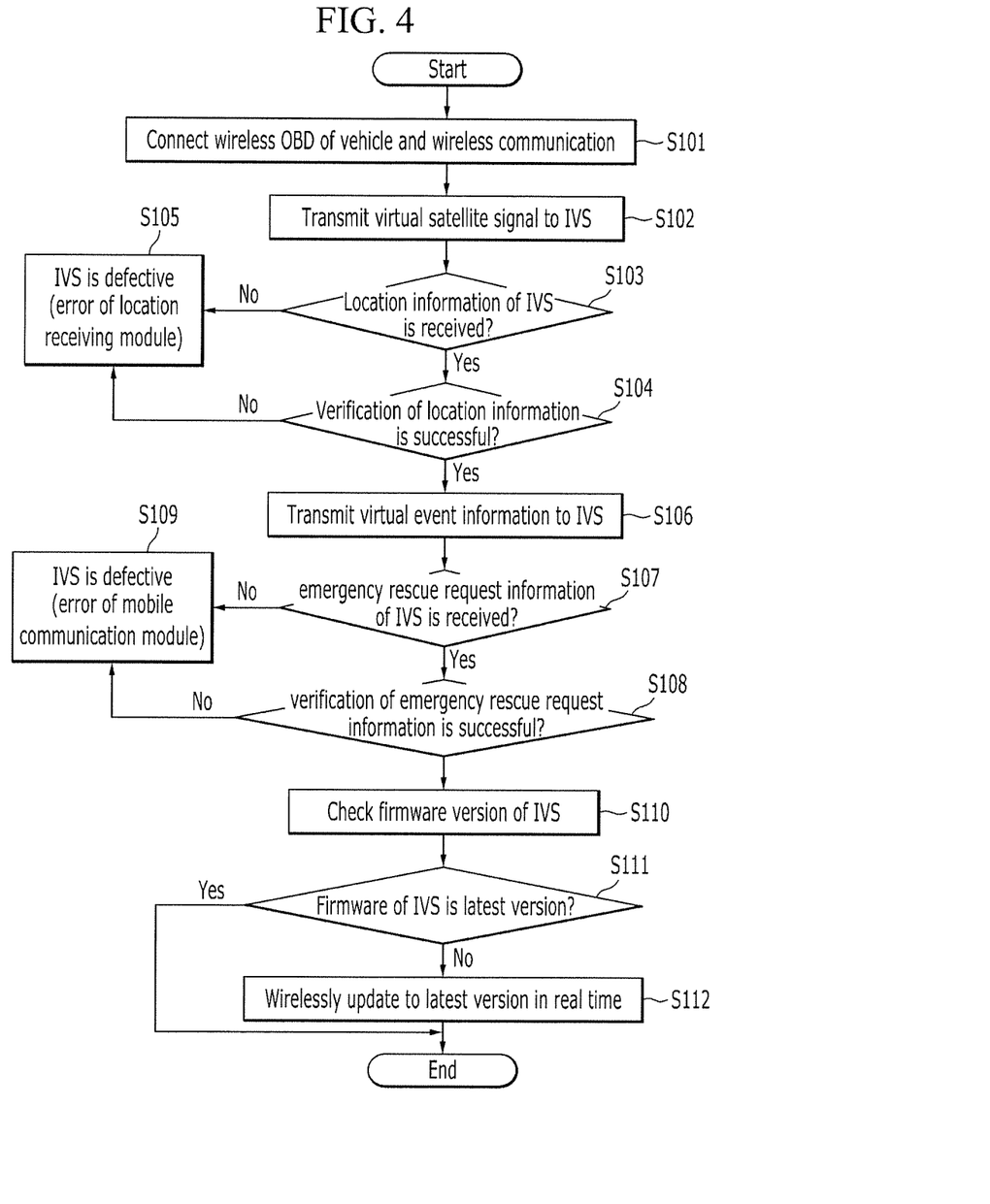
FIG. 4 is a flow chart illustrating a vehicle inspection method according to an exemplary embodiment of the present disclosure.

FIG. 4 is a flow chart illustrating a vehicle inspection method according to an exemplary embodiment of the present disclosure.

Referring to FIG. 4, the controller 150 according to an exemplary embodiment of the present disclosure connects the wireless OBD 10 of the vehicle which has entered the inspection line and wireless communication (S101). The controller 150 may determine that the vehicle has entered the inspection line by recognizing a barcode through the barcode scanner 20, refer the VIN and the wireless OBD 10 matched to the barcode to the central server 200, and connect wireless communication.

The controller 150 transmits a simulation test-exclusive protocol through the wireless OBD 10 to allow the IVS 40 to enter a simulation test mode (S102). The simulation test-exclusive protocol serves to make the vehicle recognize the simulation test in order to prevent transmission of actual emergency rescue request information to an emergency rescue agency at the time of inspecting the IVS 40.

The controller 150 transmits a virtual satellite signal to the IVS 40 through the wireless OBD 10 to test an operation of the location receiving module 42 recognizing a location of the vehicle (S103). Here, the controller 150 may transmit a virtual satellite signal (e.g., a satellite signal value corresponding to the coordinates of Yangjae IC) of GPS/GLONASS designating a predetermined location on the map.

After the virtual satellite signal is transmitted, location information checked in the IVS 40 is received within a response standby time (S103; Yes), and when vehicle coordinates of the location information match the virtual satellite signal and receive sensitivity of the main/auxiliary antennas satisfies a reference value, the controller 150 determines that verification of the location information is successful (S104; Yes).

If, however, the location information is not received within the response standby time (S103; No), the controller 150 determines that the IVS 40 is defective due to an error of the location receiving module 42 (S105).

Also, when vehicle coordinates of the location information do not match the virtual satellite signal or when the main/auxiliary antenna receive sensitivity does not satisfy the reference, the controller 150 may determine that the IVS 40 is defective due to an error of the location receiving module 42 (S105).

Meanwhile, the controller 150 tests an operation of the mobile communication module 43 supporting vehicle emergency communication by transmitting virtual event information to the IVS 40 through the wireless OBD 10 (S106). For example, the controller 150 may transmit virtual event information including a collision signal among sensors of the vehicle and an airbag deployment signal to the IVS 40.

After transmitting the virtual event information, the controller 150 receives emergency rescue request information through a SIM card number of the IVS 40 within a response standby time (S107; Yes) and analyzes the virtual emergency rescue request information. When it is determined that the virtual event information matches, the controller 150 determines that verification is successful (S108; Yes). Here, the controller 150 may further detect incoming of an emergency call according to the virtual event information through the SIM card number of the IVS 40 to determine whether the verification is successful.

If, however, the emergency rescue request information is not received within the response standby time (S107; No), the controller 150 determines that the IVS 40 is defective due to an error of the mobile communication module 43 (S109).

Also, if the virtual event information of the emergency rescue request information does not match or the emergency call is not received, the controller 150 may determine that the IVS 40 is defective due to an error of the mobile communication module 43 (S109).

Meanwhile, the controller 150 checks a firmware version of the IVS 40 through the wireless OBD 10 to test the FOTA service (S110).

Here, when the firmware version of the IVS 40 is a finally registered latest version (S111; Yes), the controller 150 terminates inspection of the vehicle without updating firmware.

If, however, the firmware version of the IVS 40 is not a latest version (S111; No), the controller 150 may update the firmware of the IVS 40 to a latest version in real time (S112) and terminate the vehicle inspection.

Thereafter, the controller 150 may store results of vehicle inspection by VINs, and transmit the results of vehicle inspection to the central server 200 to share.

So far, the vehicle inspection method has been described on the basis of the controller 150 as a subject with reference to FIG. 4.

However, the exemplary embodiment of the present disclosure is not limited thereto and, since the controller 150 is a component included in the inspector 100, it will be obvious that a substantial subject of the vehicle inspection method with reference to FIG. 4 may be described as the inspector 100.

In this manner, according to an exemplary embodiment of the present disclosure, reliability of the emergency road call service may be enhanced by checking performance through the simulation test of the IVS by connecting the vehicle which enters the inspection line and wireless communication.

Also, when simulation testing is performed, a cause of a defective IVS may be diagnosed by verifying accident location information and emergency rescue request information.

In addition, since inspection on performance of the IVS, which is limitedly performed by a collision test in a road environment in the related art, is performed by wireless communication in a vehicle inspection line, it is possible to simulation-test the entire mass-produced vehicles.

The exemplary embodiments of the present disclosure may not necessarily be implemented only through the foregoing devices and/or methods but may also be implemented through a program for realizing functions corresponding to the configurations of the exemplary embodiments of the present disclosure, a recording medium including the program, or the like. Such an implementation may be easily conducted by a person skilled in the art to which the present disclosure pertains from the foregoing description of exemplary embodiments.

The exemplary embodiments of the present disclosure have been described in detail, but the scope of the present invention is not limited thereto and various variants and modifications by a person skilled in the art using a basic concept of the present invention defined in claims also belong to the scope of the present invention.

What is claimed is:

1. A vehicle inspection system installed in an inspection line of a vehicle factory, the vehicle inspection system comprising:
   a barcode reader configured to recognize a vehicle which enters the inspection line;
   an antenna configured to connect a wireless on-board diagnostics (OBI)) installed in the vehicle and wireless communication;
   an in-vehicle eCall system (IVS) installed in the vehicle and configured to provide an emergency road call service; and
   an inspector configured to determine whether the IVS operates normally through a simulation test of transmitting virtual accident event information to the vehicle connected to the wireless communication.

2. The vehicle inspection system of claim 1, wherein:
   the IVS includes: a communication module configured to receive accident event information sensed by a sensor within the vehicle;
   a location receiving module configured to determine vehicle location information upon receiving a satellite signal from a GNSS (Global Navigation Satellite System);
   a control module configured to generate emergency rescue request information on the basis of the accident event information and the vehicle location information; and
   a mobile communication module configured to transmit the emergency rescue request information to a set emergency rescue agency.

3. The vehicle inspection system of claim 2, wherein:
   the location receiving module determines the vehicle location information upon receiving a signal from at least one of GPS (Global Positioning System), GLONASS, and A-GPS (Assisted Global Positioning System) systems.

4. The vehicle inspection system of claim 2, wherein:
   when an accident event occurs, the mobile communication module automatically transmits the emergency rescue request information including at least one of a vehicle location, an accident type, vehicle information, a movement speed, and a movement direction to a related emergency rescue agency through a subscriber identification module (SIM) card.

5. The vehicle inspection system of claim 2, wherein:
   when an accident event occurs, the control module receives sensing information for generating the emergency rescue request information through association with an audio video navigation (AVN) and displays the accident event related information on a screen.

6. The vehicle inspection system of claim 2, wherein:
   when a call is connected to the emergency rescue agency through the mobile communication module, the control module attempts the call through a handsfree function of the AVN to connect the call.

7. The vehicle inspection system of claim 2, wherein:
the control module stores an algorithm for the simulation test with the inspector, and when the virtual accident event information using a test-exclusive protocol is received from the inspector, the control module enters a simulation test mode to respond.

8. The vehicle inspection system of claim 1, wherein:
the inspector includes: a communicator connected to the wireless OBD through the antenna and transmitting and receiving information for vehicle inspection;
a simulator generating the virtual accident event information for the simulation test;
a FOTA (Firmware Over The Air) service updating a firmware version of the IVS to a latest version through the wireless communication; and
a controller controlling a general operation for the simulation test.

9. The vehicle inspection system of claim 8, wherein:
the simulator generates the virtual accident event information including a virtual satellite signal for the simulation test and a per-accident type sensor signal.

10. The vehicle inspection system of claim 8, wherein:
the controller transmits a virtual satellite signal to the IVS, and when checked vehicle location information is received within a response standby time, the controller determines that verification of the location receiving module configured in the IVS is successful.

11. The vehicle inspection system of claim 8, wherein:
the controller transmits the virtual accident event information to the IVS, and when the emergency rescue request information is received through the SIM card of the IVS within a response standby time, the controller determines that verification of a mobile communication module configured in the IVS is successful.

12. A vehicle inspection method for wirelessly inspecting a vehicle by an inspector installed in an inspection line of a vehicle factory, the vehicle inspection method comprising steps of:
connecting a wireless on-board diagnostics (OBD) installed in the vehicle to a wireless communication to perform a simulation test;
transmitting, by a controller, a virtual satellite signal to an in-vehicle eCall system (IVS) providing an emergency road call service, and determining, by the controller, that verification of a location receiving module is successful when checked vehicle location information is received within a response standby time;
transmitting, by the controller, virtual event information to the IVS, and determining, by the controller, that verification of a mobile communication module is successful when emergency rescue request information of the IVS is received within a response standby time; and
when verification of the location receiving module and verification of the mobile communication module are successful, determining, by the controller that the IVS normally operates.

13. The vehicle inspection method of claim 12, wherein:
in the step of connecting the wireless OBD to the wireless communication, a barcode adhered to the vehicle is recognized, and a vehicle identification number (VIN) matched to the barcode and the wireless OBD are referred to a central server to connect the wireless communication.

14. The vehicle inspection method of claim 12, wherein:
the step of connecting the wireless OBD to the wireless communication includes a step of transmitting a simulation test-exclusive protocol through the wireless OBD to enable the IVS to enter a simulation test mode.

15. The vehicle inspection method of claim 12, wherein:
in the step of transmitting the virtual satellite signal to the IVS and determining that verification of the location receiving module is successful, it is determined that verification of the location information is successful only when coordinates of the received vehicle location information match the virtual satellite signal and receive sensitivity of the satellite signal satisfies a reference value.

16. The vehicle inspection method of claim 12, wherein:
the step of transmitting the virtual satellite signal to the IVS and determining that verification of the location receiving module is successful includes determining that the location receiving module has an error when the vehicle location information is not received within the response standby time.

17. The vehicle inspection method of claim 12, wherein:
in the step of transmitting the virtual event information to the IVS, and determining that verification of the mobile communication module is successful, incoming of an emergency call according to the virtual event information through an SIM card number of the IVS is further detected to determine whether the verification is successful.

18. The vehicle inspection method of claim 12, wherein:
in the step of transmitting the virtual event information to the IVS, and determining that verification of the mobile communication module is successful, the emergency rescue request information is analyzed, and it is determined that the verification is successful only when the emergency rescue request information matches the virtual event information.

19. The vehicle inspection method of claim 12, wherein:
the step of transmitting the virtual event information to the IVS, and determining that verification of the mobile communication module is successful includes determining, by the controller, that the mobile communication module has an error when the emergency rescue request information is not received within the response standby time.

20. The vehicle inspection method of claim 12, wherein:
the step of transmitting the virtual event information to the IVS, and determining that verification of the mobile communication module is successful includes checking, by the controller, a firmware version of the IVS through the wireless OBD, and updating the firmware version of the IVS to a latest version when the firmware version is not the latest version.

* * * * *